United States Patent
Leppänen et al.

(10) Patent No.: US 11,200,739 B2
(45) Date of Patent: Dec. 14, 2021

(54) VIRTUAL SCENE

(71) Applicant: Nokia Technologies Oy, Espoo (FI)

(72) Inventors: Jussi Artturi Leppänen, Tampere (FI);
Sujeet Shyamsundar Mate, Tampere (FI); Arto Lehtiniemi, Lempäälä (FI);
Antti Johannes Eronen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 15 days.

(21) Appl. No.: 16/789,487

(22) Filed: Feb. 13, 2020

(65) Prior Publication Data
US 2020/0273249 A1 Aug. 27, 2020

(30) Foreign Application Priority Data

Feb. 21, 2019 (EP) .................................... 19158534

(51) Int. Cl.
*G06T 19/00* (2011.01)
*H04S 3/00* (2006.01)
*H04S 7/00* (2006.01)

(52) U.S. Cl.
CPC .......... *G06T 19/003* (2013.01); *G06T 19/006* (2013.01); *H04S 3/008* (2013.01); *H04S 7/303* (2013.01); *H04S 2400/01* (2013.01); *H04S 2400/11* (2013.01)

(58) Field of Classification Search
CPC ............. H04S 2420/01; H04S 2400/11; H04S 2400/01; H04S 7/302; H04S 7/30; H04S 7/303
USPC .......................................... 381/310, 303, 10
See application file for complete search history.

(56) References Cited

U.S. PATENT DOCUMENTS

| | | | |
|---|---|---|---|
| 2002/0026477 A1* | 2/2002 | Choi | G06Q 30/02 709/204 |
| 2003/0091204 A1 | 5/2003 | Gibson | |
| 2014/0002444 A1* | 1/2014 | Bennett | G06F 3/0304 345/419 |
| 2019/0213800 A1* | 7/2019 | Jiang | A63F 13/25 |

(Continued)

FOREIGN PATENT DOCUMENTS

| | | |
|---|---|---|
| EP | 3236345 A1 | 10/2017 |
| EP | 3343348 A1 | 7/2018 |

(Continued)

OTHER PUBLICATIONS

EP Application No. 19155843.6, "An Apparatus, Method or Computer Program for Rendering Sound Scenes Defined by Spatial Audio Content to a User", filed on Feb. 6, 2019, 48 pages.

(Continued)

*Primary Examiner* — Alexander Krzystan
(74) *Attorney, Agent, or Firm* — Alston & Bird LLP

(57) ABSTRACT

An apparatus, method and computer program is described, comprising: determining a similarity between a content of a first zone and a content of at least one or more other zones of a multi-zone virtual scene, in response to a modification of the content of said first zone, wherein content as perceived by a user within said scene is dependent on a virtual position of the user within said scene; and determining an updated rendering position of the first zone relative to said one or more other zones within the virtual scene, dependent on the determined similarities.

17 Claims, 8 Drawing Sheets

(56) References Cited

U.S. PATENT DOCUMENTS

2019/0295151 A1* 9/2019 Ghadar ................ G06T 19/006
2020/0252739 A1 8/2020 Eronen et al.
2021/0006918 A1* 1/2021 Munoz .................. H04W 4/44

FOREIGN PATENT DOCUMENTS

EP 3693846 8/2020
GB 2551521 A 12/2017

OTHER PUBLICATIONS

"Multidimensional Scaling", Wikipedia, Retrieved on Jan. 24, 2020, Webpage available at : https://en.wikipedia.org/wiki/Multidimensional_scaling.

Extended European Search Report received for corresponding European Patent Application No. 19158534.8, dated Jul. 12, 2019, 8 pages.

* cited by examiner

VIRTUAL SCENE

FIELD

This specification relates to virtual scenes, for example to multi-zone virtual scenes.

BACKGROUND

A multi-zone virtual scene enables a user to move around the virtual scene and to experience content from the various zones in different ways depending on a virtual location of the user within the scene. There remains a need for alternative arrangements for providing and controlling such multi-zone virtual scenes.

SUMMARY

In a first aspect, this specification describes an apparatus comprising: means for determining a similarity between a content of a first audio zone and a content of at least one or more other audio zones of a multi-zone virtual scene (such as a scene of a virtual reality system), in response to a modification of the content of said first audio zone, wherein content as perceived by a user within said scene is dependent on a virtual position of the user within said scene and wherein said audio zones each have an initial rendering position within the scene; and means for determining an updated rendering position of the first audio zone relative to said one or more other audio zones within the virtual scene, dependent on the determined similarity. The multi-zone virtual scene may be a virtual audio scene or a virtual reality (VR), augment reality (AR), mixed reality (MR) or extended reality (XR) scene. The content of at least one of said first audio zone and at least one of said one or more other audio zones of the multi-zone virtual scene may comprise spatial audio content. Thus, in some embodiments, some or all of said zones may comprise at least one spatial audio source.

Some embodiments may further comprise means for determining a first user interaction causing said modification of said content of said first audio zone. Alternatively, or in addition, some embodiments may comprise means for initiating a second user interaction causing said modification of said content of said first audio zone.

The said means for determining a similarity between the content of the first audio zone and the content of the at least one or more other audio zones may determine said similarity based on similarities of attributes of said audio zones. The said attributes may comprise detected attributes or user-defined attributes. User-defined attributes may, for example, be based on metadata. For music, the said attributes may include one or more of: pitch, key, timbre, spectrum, instrumentation, mood, style, harmony etc.

The means for determining said similarity may determine said similarity based on weighted sum of similarities of a plurality of attributes of said audio zones. The weighted sum may be based on the relative importance of the various attributes. The said attributes may comprise detected attributes or user-defined attributes. User-defined attributes may, for example, be based on metadata.

In some embodiments, the updated rendering position of the first audio zone relative to said at least one or more other audio zones may be defined such that the first audio zone is moved closer to at least one audio zone that are more similar as a result of said modification and/or further away from at least one audio zone that is/are less similar as a result of said modification.

Some embodiments further comprise means for determining an updated rendering position of one or more of said other audio zones of the multi-zone virtual scene, in response to the modification of the content of said first audio zone. The means for determining the updated rendering position of the first audio zone and the means for determining the updated rendering positions of the said one or more other audio zones of the multi-zone virtual scene may be implemented using multidimensional scaling. Alternatively, or in addition, the updated rendering positions of said first audio zone and said other audio zones may be determined such that distances between audio zones are inversely proportional to determined similarities.

Some embodiments further comprise means for implementing a rendering position of at least said first audio zone based on said determined updated rendering position(s). The means for implementing the rendering position of at least said first audio zone may comprise means for adjusting the position of at least said first audio zone within said virtual scene. The means for adjusting said position of at least said first audio zone may adjust said position gradually.

The said means may comprise: at least one processor; and at least one memory including computer program code, the at least one memory and the computer program code configured, with the at least one processor, to cause the performance of the apparatus.

In a second aspect, this specification describes a method comprising: determining a similarity between a content of a first audio zone and a content of at least one or more other audio zones of a multi-zone virtual scene, in response to a modification of the content of said first audio zone, wherein content as perceived by a user within said scene is dependent on a virtual position of the user within said scene; and determining an updated rendering position of the first audio zone relative to said one or more other audio zones within the virtual scene, dependent on the determined similarities (the audio zones each having an initial position within the scene).

The method may comprise determining a first user interaction causing said modification of said content of said first audio zone. Alternatively, or in addition, the method may comprise initiating a second user interaction causing said modification of said content of said first audio zone.

The method may further comprise determining an updated rendering position of one or more of said other audio zones of the multi-zone virtual scene, in response to the modification of the content of said first audio zone.

The method may comprise implementing a rendering position of at least said first audio zone based on said determined updated rendering position(s).

In a third aspect, this specification describes any apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: determine a similarity between a content of a first audio zone and a content of at least one or more other audio zones of a multi-zone virtual scene, in response to a modification of the content of said first audio zone, wherein content as perceived by a user within said scene is dependent on a virtual position of the user within said scene; and determine an updated rendering position of the first audio zone relative to said one or more other audio zones within the virtual scene, dependent on the determined similarities (the audio zones each having an initial position within the scene).

In a sixth aspect, this specification describes a computer-readable medium (such as a non-transitory computer readable medium) comprising program instructions stored thereon for performing at least the following: determining a similarity between a content of a first audio zone and a content of at least one or more other audio zones of a multi-zone virtual scene, in response to a modification of the content of said first audio zone, wherein content as perceived by a user within said scene is dependent on a virtual position of the user within said scene; and determining an updated rendering position of the first audio zone relative to said one or more other audio zones within the virtual scene, dependent on the determined similarities (the audio zones each having an initial position within the scene).

In a seventh aspect, this specification describes an apparatus comprising: at least one processor; and at least one memory including computer program code which, when executed by the at least one processor, causes the apparatus to: determine a similarity between a content of a first audio zone and a content of at least one or more other audio zones of a multi-zone virtual scene, in response to a modification of the content of said first audio zone, wherein content as perceived by a user within said scene is dependent on a virtual position of the user within said scene; and determine an updated rendering position of the first audio zone relative to said one or more other audio zones within the virtual scene, dependent on the determined similarities (the audio zones each having an initial position within the scene).

In an eighth aspect, this specification describes an apparatus comprising: a first control module for determining a similarity between a content (e.g. spatial audio content) of a first audio zone and a content (e.g. spatial audio content) of at least one or more other audio zones of a multi-zone virtual scene (such as a scene of a virtual reality system), in response to a modification of the content of said first audio zone, wherein content as perceived by a user within said scene is dependent on a virtual position of the user within said scene and wherein said audio zones each have an initial rendering position within the scene; and a second control module for determining an updated rendering position of the first audio zone relative to said one or more other audio zones within the virtual scene, dependent on the determined similarity.

BRIEF DESCRIPTION OF THE DRAWINGS

Example embodiments will now be described, by way of non-limiting examples, with reference to the following schematic drawings.

DETAILED DESCRIPTION

Figure 1:
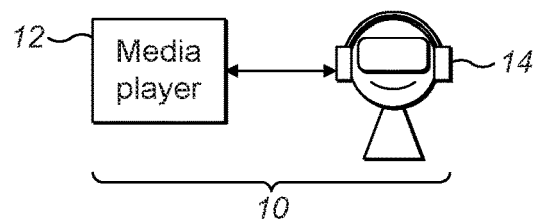
FIG. 1 is a block diagram of a virtual reality display system in which example embodiments may be implemented.

In the description, like reference numerals relate to like elements throughout.

Example embodiments described herein relate to extended realities, such as virtual reality and augmented reality implementing a 6-degrees-of-freedom (6DoF) content representation and presentation. For example, some embodiments relate to how a virtual reality content is delivered and rendered to a user and how a user is able to control the content rendering in a meaningful way while moving about a virtual reality scene.

Extended reality (XR) is a term that refers to real and virtual combined environments and human-machine interactions generated, for example, by digital technology and various wearable devices. Extended reality includes representative forms such as augmented reality (AR), augmented virtuality (AV), mixed reality (MR), and virtual reality (VR) and any relevant interpolations.

Virtual reality (VR) can generally be understood as a rendered version of visual and/or audio scenes. The rendering is typically designed to closely mimic the visual and audio sensory stimuli of the real world in order to provide a user a natural experience that is at least significantly consistent with their movement within a virtual scene according to the limits defined by the content and/or application.

VR in many cases, but not necessarily all cases, requires a user to wear a head mounted display (HMD), to completely replace the user's field of view with a simulated visual presentation, and to wear headphones, to provide the user the simulated audio content similarly completely replacing the sound scene of the physical space. Some form of head tracking and general motion tracking of the user consuming VR content may also be necessary. This allows the simulated visual and audio presentation to be updated in order to ensure that, from the user's perspective, various scene components such as items and sound sources remain consistent with the user's movements. Additional means to interact with the virtual reality simulation, such as controls or other user interfaces (UI) may be provided but are not strictly necessary for providing the experience.

VR can in some use cases be visual-only or audio-only virtual reality. For example, an audio-only VR experience may relate to a new type of music listening or any other audio experience.

Augmented reality (AR) generally refers to providing user with additional information or artificially generated items or content that is at least significantly overlaid upon the user's current real-world environment stimuli. In some such cases, the augmented content may at least partly replace a real-world content for the user. Additional information or content will usually be visual and/or audible. Similarly to VR, but potentially in more applications and use cases, AR may have visual-only or audio-only presentation. For example, a user may move about a city and receive audio guidance relating to, e.g., navigation, location-based advertisements, and any other location-based information.

Mixed reality (MR) is sometimes considered as a more advanced form of AR where at least some virtual elements are inserted into the physical scene such that they provide the illusion that these elements are part of the real scene and behave accordingly. For audio content, or indeed audio-only use cases, many applications of AR and MR may appear difficult for the user to tell from one another. However, the difference is not only for visual content but it may be relevant also for audio. For example, MR audio rendering may take into account a local room reverberation, e.g., while AR audio rendering may not.

In a 3D space, there are in total six degrees of freedom (DoF) defining the way the user may move within said space. This movement is divided into two categories: rotational movement and translational movement (with three degrees of freedom each). Rotational movement is sufficient for a simple VR experience where the user may turn his/her head (pitch, yaw, and roll) to experience the space from a static point or along an automatically moving trajectory. Translational movement means that the user may also change the position of the rendering, i.e., move along the x, y, and z axes in Euclidean space according to their wishes. Free-viewpoint AR/VR experiences allow for both rotational and translational movements. It is common to talk about the various degrees of freedom and the related experiences using the terms 3DoF, 3DoF+ and 6DoF. 3DoF+ falls somewhat between 3DoF and 6DoF and typically allows for some limited user movement, e.g., it can be considered to implement a restricted 6DoF where the user is sitting down but can lean their head in various directions.

FIG. 1 is a schematic illustration of a virtual reality display system 10 which represents example user-end equipment. The virtual reality display system 10 includes a user device in the form of a virtual reality headset 14, for displaying visual data and/or presenting audio data for a virtual reality space, and a virtual reality media player 12 for rendering visual and/or audio data on the virtual reality headset 14. In some example embodiments, a separate user control (not shown) may be associated with the virtual reality display system, e.g. a hand-held controller.

A virtual space, world or environment may be a computer-generated version of a space, for example a captured real world space, in which a user can be immersed. In some example embodiments, the virtual space or scene may be entirely computer-generated. The virtual reality headset 14 may be of any suitable type. The virtual reality headset 14 may be configured to provide virtual reality video and/or audio content data to a user. As such, the user may be immersed in virtual space.

In the example virtual reality display system 10, the virtual reality headset 14 receives the virtual reality content data from a virtual reality media player 12. The virtual reality media player 12 may be part of a separate device that is connected to the virtual reality headset 14 by a wired or wireless connection. For example, the virtual reality media player 12 may include a games console, or a PC (Personal Computer) configured to communicate visual data to the virtual reality headset 14.

Alternatively, the virtual reality media player 12 may form part of the virtual reality headset 14.

The virtual reality media player 12 may comprise a mobile phone, smartphone or tablet computer configured to provide content through its display. For example, the virtual reality media player 12 may be a touchscreen device having a large display over a major surface of the device, through which video content can be displayed. The virtual reality media player 12 may be inserted into a holder of a virtual reality headset 14. With such virtual reality headsets 14, a smart phone or tablet computer may display visual data which is provided to a user's eyes via respective lenses in the virtual reality headset 14. The virtual reality audio may be presented, e.g., by loudspeakers that are integrated into the virtual reality headset 14 or headphones that are connected to it. The virtual reality display system 10 may also include hardware configured to convert the device to operate as part of virtual reality display system 10. Alternatively, the virtual reality media player 12 may be integrated into the virtual reality headset 14. The virtual reality media player 12 may be implemented in software. In some example embodiments, a device comprising virtual reality media player software is referred to as the virtual reality media player 12.

The virtual reality display system 10 may include means for determining the spatial position of the user and/or orientation of the user's head. This may be by means of determining the spatial position and/or orientation of the virtual reality headset 14. Over successive time frames, a measure of movement may therefore be calculated and stored. Such means may comprise part of the virtual reality media player 12. Alternatively, the means may comprise part of the virtual reality headset 14. For example, the virtual reality headset 14 may incorporate motion tracking sensors which may include one or more of gyroscopes, accelerometers and structured light systems. These sensors generate position data from which a current visual field-of-view (FOV) is determined and updated as the user, and so the virtual reality headset 14, changes position and/or orientation. The virtual reality headset 14 may comprise two digital screens for displaying stereoscopic video images of the virtual world in front of respective eyes of the user, and also two headphones, earphone or speakers for delivering audio. The example embodiments herein are not limited to a particular type of virtual reality headset 14.

In some example embodiments, the virtual reality display system 10 may determine the spatial position and/or orientation of the user's head using the above-mentioned six degrees-of-freedom method. These may include measurements of pitch, roll and yaw and also translational movement in Euclidean space along side-to-side, front-to-back and up-and-down axes.

The virtual reality display system 10 may be configured to display virtual reality content data to the virtual reality headset 14 based on spatial position and/or the orientation of the virtual reality headset. A detected change in spatial position and/or orientation, i.e. a form of movement, may result in a corresponding change in the visual and/or audio data to reflect a position or orientation transformation of the user with reference to the space into which the visual data is projected. This allows virtual reality content data to be consumed with the user experiencing a 3D virtual reality environment.

In the context of volumetric virtual reality spaces or worlds, a user's position may be detected relative to content provided within the volumetric virtual reality content, e.g. so that the user can move freely within a given virtual reality space or world, around individual objects or groups of objects, and can view and/or listen to the objects from different angles depending on the rotation of their head.

Audio data may be provided to headphones provided as part of the virtual reality headset 14. The audio data may represent spatial audio source content. Spatial audio may refer to directional rendering of audio in the virtual reality space or world such that a detected change in the user's spatial position or in the orientation of their head may result in a corresponding change in the spatial audio rendering to reflect a transformation with reference to the space in which the spatial audio data is rendered.

Figure 2:
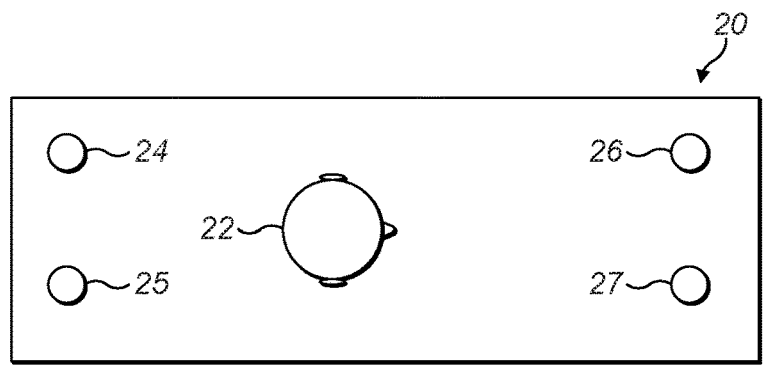
FIGS. 2 to 4 show virtual environments demonstrating example uses of the system of FIG. 1.

FIG. 2 shows a virtual environment, indicated generally by the reference numeral 20, that may be implemented using the virtual reality display system 10. The virtual environment 20 shows a user 22 and first to fourth sound sources 24 to 27. The user 22 may be wearing the virtual reality headset 14 described above.

The virtual environment 20 is a virtual audio scene and the user 22 has a position and an orientation within the scene. The audio presented to the user 22 (e.g. using the virtual reality headset 14) is dependent on the position and orientation of the user 22, such that a 6DoF audio scene is provided.

Figure 3:
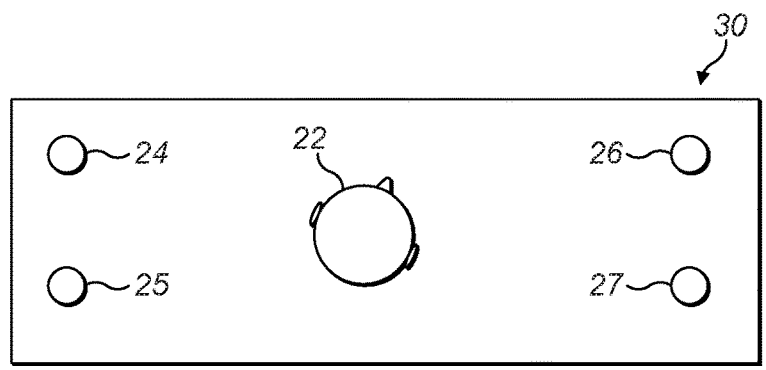

FIG. 3 shows a virtual environment, indicated generally by the reference numeral 30, in which the orientation of the user 22 has changed relative to the orientation shown in FIG. 2. The user position is unchanged. By changing the presentation to the user 22 of the audio from the sound sources 24 to 27 on the basis of the orientation of the user, an immersive experience can be enhanced.

Figure 4:
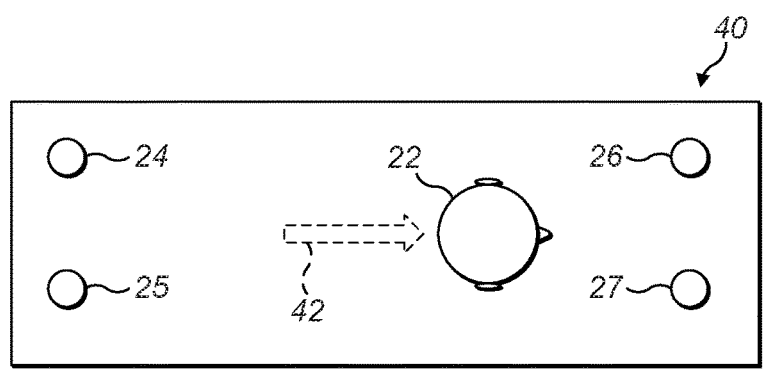

FIG. 4 shows a virtual environment, indicating generally by the reference numeral 40, in which the position of the user 22 has changed relative to the position shown in FIG. 2 (indicated by the translation arrow 42), but the orientation of the user is unchanged relative to the orientation shown in FIG. 2. By changing the presentation to the user 22 of the audio from the sound sources 24 to 27 on the basis of the position of the user (e.g. by making audio sources louder and less reverberant and the user approaches the audio source in the virtual environment), an immersive experience can be enhanced.

Clearly, both the position and the orientation of the user 22 could be changed at the same time. It is also noted that a virtual audio environment can include both diegetic and non-diegetic audio elements, i.e., audio elements that are presented to the user from a static direction/position of the virtual environment during change in user orientation and audio elements that are presented from an unchanged direction/position of the virtual environment regardless of any user rotation.

Figure 5:
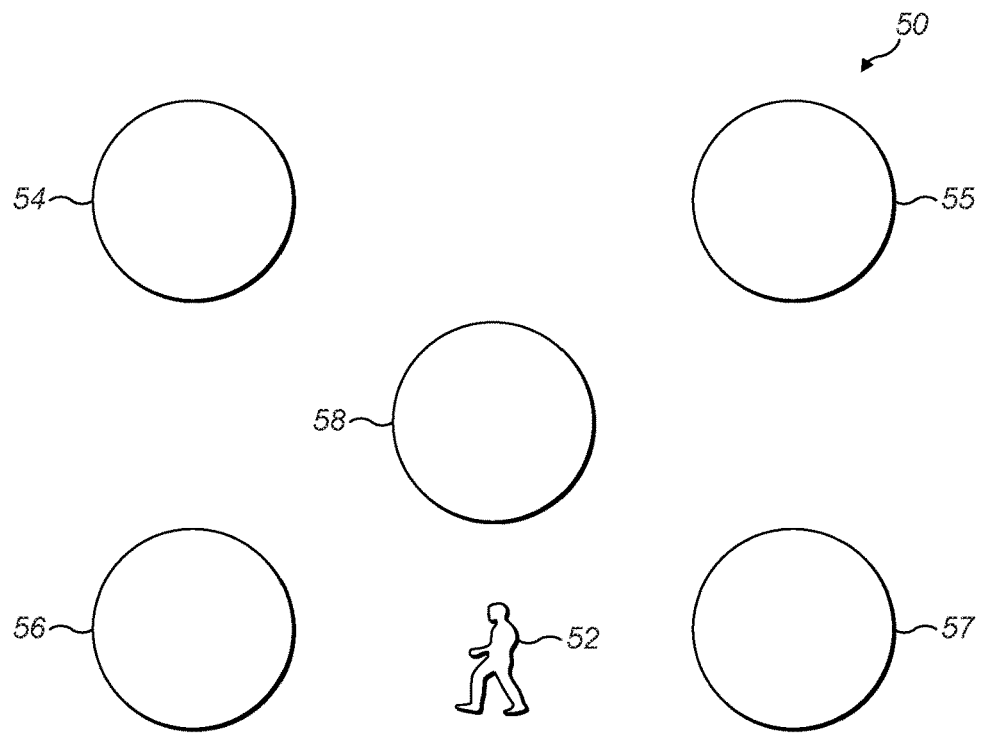
FIGS. 5 to 8 are views of virtual scenes in accordance with example embodiments.

FIG. 5 is a view of a virtual scene, indicated generally by the reference numeral 50, in accordance with an example embodiment. The scene 50 includes a user 52, a first audio zone 54, a second audio zone 55, a third audio zone 56, a fourth audio zone 57 and a fifth audio zone 58. The user 52 is free to move around the scene 50 into, and between, any of the audio zones 54 to 58. Moreover, the user 52 may be able to change orientation. Thus, the user may be able to change both location and orientation within the scene 50, thereby providing 6-DoF movement.

By way of example, the scene 50 may illustrate an example musical composition in which each zone represents a different audio output (e.g. a different collection of instruments) such that the user 52 is able to move about the musical composition, experiencing different audio in different locations.

Audio content, such as music compositions, is often optimised for consumption as stereo, or perhaps via a set of loudspeakers which provide an optimal listening experience in a single position. Such content may be referred to as single sweet-spot content (SSC). The scene 50 may provide compositions with multiple sweet-spots (MSC) as part of the same composition, providing a stronger motivation for the user 52 to move between different sweet spots (e.g. between the audio zones 54 to 58).

Figure 6:
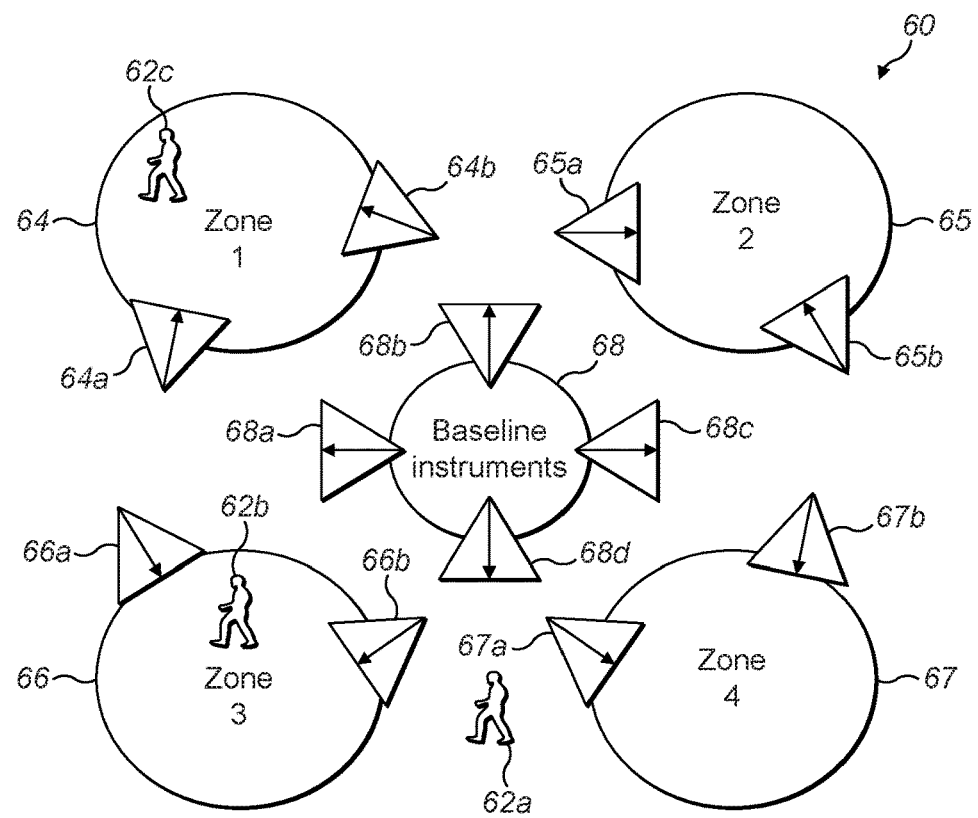

FIG. 6 is a view of a virtual scene, indicated generally by the reference numeral 60, in accordance with an example embodiment. The scene 60 comprises a first audio zone 64, a second audio zone 65, a third audio zone 66, a fourth audio zone 67 and a fifth audio zone 68. A user 62 is free to move around the scene 60 into, and between, any of the audio zones 64 to 68 and to change orientation, in order to provide 6-DoF movement. By way of example, a first user position 62a, a second user position 62b and a third user position 62c are shown in FIG. 6.

The first audio zone 64 may comprise a number of sounds, for example as provided by one or more musical instruments. The first audio zone 64 may be a "sweet-spot" for sounds from those instruments. As indicated schematically by the arrows 64a and 64b (which indicate the direction in which the relevant source—such as a musical instrument—is facing), the sounds within the first zone are experienced better within that zone than outside that zone. In some embodiments, the sounds may be inaudible outside the first audio zone 64; in other embodiments, the sounds are audible outside the first zone, but an optimal experience is only obtained when inside the first zone.

In a similar way, the second, third and fourth audio zones 65 to 67 each comprise a number of sounds, for example as provided by one or more musical instruments. Each of the second to fourth audio zones may be a "sweet-spot" for sounds from the instruments within the respective zone. As indicated schematically by the arrows 65a, 65b, 66a, 66b, 67a and 67b, the sounds within those zones are experienced better within the zones that outside the zones. In some embodiments, the sounds of at least some of those zones may be inaudible outside the respective zone; in other embodiments, the sounds are audible outside the respective zone, but an optimal experience is only obtained when inside the respective zone.

The fifth audio zone 68 may be a baseline audio zone, including content that is intended to be heard in all parts of the scene 60 (as indicated schematically by the outward extending arrows 68a, 68b, 68c and 68d); indeed, the audio content may be located at the centre of the audio zone 68 such that sounds are rendered in an omnidirectional manner. Example baseline content includes bass and drum sounds. The other audio zones may include instruments that are meant to be heard loudly only when the user is within the zone (i.e. within the sweet-spot for that instrument or collection of instruments).

As indicated above, a user 62 is free to move around the scene 60. When in the first user position 62a, the user 62 is not within any of the sweet-spot zones of the scene 60. The user will be able to hear sounds from the fifth audio zone 68. The user may also be able to hear sounds, for example, from the third audio zone 66 and/or the fourth audio zone 67 (if those sounds are audible outside the respective zones), but the audio experience for those zones will not be optimal.

When in the second user position 62b, the user will be able to hear sounds from both the third audio zone 66 and the fifth audio zone 68 and those audio sounds may be optimal. The user may also be able to hear sounds from other audio zones (such as the first audio zone 64 and the fourth audio zone 67) if those sounds are audible at the respective distances from those zones; however, those sounds will not be optimal, and the overall experience will be dominated by sounds from the third and fifth audio zones.

When in the third user position 62c, the user will be able to hear sounds from both the first audio zone 64 and the fifth audio zone 68 and those audio sounds may be optimal. The user may also be able to hear sounds from other audio zones (such as the second audio zone 65 and the third audio zone 66) if those sounds are audible at the respective distances from those zones; however, those sounds will not be optimal, and the overall experience will be dominated by sounds from the first and fifth audio zones. Note that the third user position 62c is such that the user is further away from neighbouring zones than the second user position 62b discussed above; accordingly, sounds from the neighbouring zones to the third user position may be quieter (and less optimal) than sounds from the neighbouring zones to the second user position.

Figure 7:
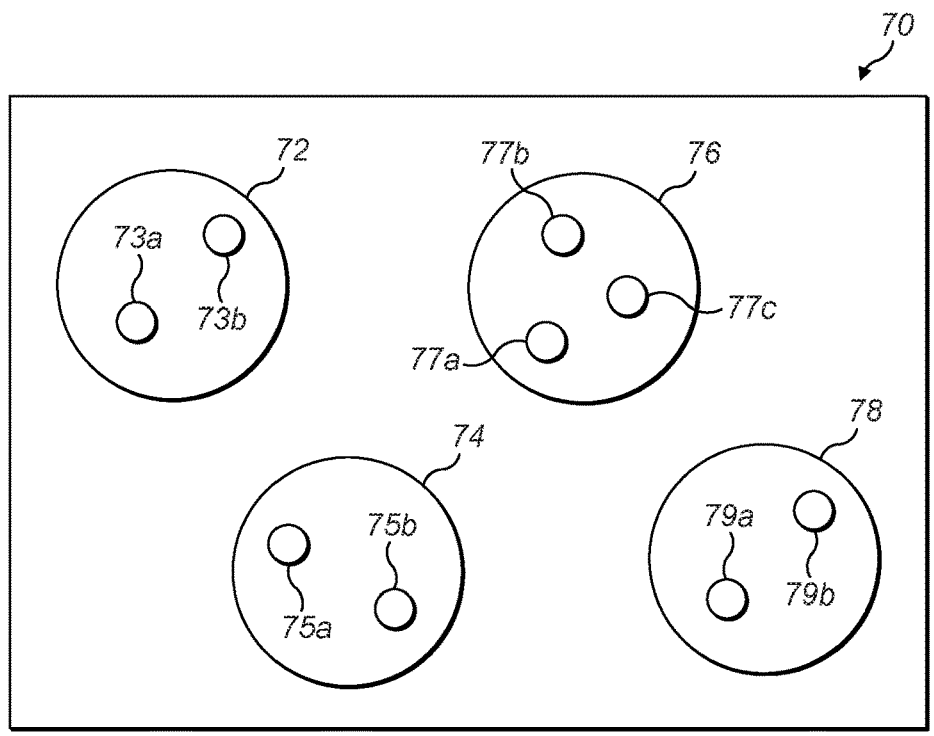

FIG. 7 is a view of a virtual scene, indicated generally by the reference numeral 70, in accordance with an example embodiment. The scene 70 comprises a first audio zone 72, a second audio zone 74, a third audio zone 76 and a fourth audio zone 78. A user is free to move around the scene 70 into, and between, any of the audio zones 72, 74, 76 and 78 and to change orientation, in order to provide 6-DoF movement.

The first audio zone 72 includes a first sound source 73a and a second sound source 73b. The first and second sound sources 73a and 73b of the first audio zone may be musical instruments (such as a distorted electric guitar and a bass guitar respectively). The second audio zone 74 includes a first sound source 75a and a second sound source 75b. The first and second sound sources 75a and 75b of the second audio zone may be musical instruments (such as a first and a second acoustic guitar respectively). The third audio zone 76 includes a first sound source 77a, a second sound source 77b and a third sound source 77c. The first, second and third sound sources of the third audio zone may be musical instruments (such as a shaker, bongos and a cajon respectively). The fourth audio zone 78 includes a first sound source 79a and a second sound source 79b. The first and second sound sources of the fourth audio zone may be musical instruments (such as a harmonica and an accordion respectively).

In a similar manner to the scene 60 described above, the third audio zone 76 of the scene 70 may include sounds that are intended to be heard in all parts of the scene 70, with the other audio zones containing instruments meant to be heard optimally (such as loudly) when the user in the respective zone (or sweet-spot).

It is possible that even if the instruments of each of the audio zones of the scene 70 are compatible with the sounds of the third audio zone 76 (such that such a sound combination sounds good to a virtual listener), the instruments of one zone may not be compatible with instruments of another zone. For example, the distorted electric guitar 73a of the first audio zone 72 may be compatible with the instruments of the second audio zone 74 and the third audio zone 76, but may be incompatible with the accordion 79b of the fourth audio zone 78.

Thus, some zones may be incompatible with other zones. Compatibility may be defined in many different ways. For example, in the case of music, some instruments sound good together (and are therefore compatible) and some do not. Other indicators of compatibility include tonality (where certain musical notes, melodies or harmonies sound good together and some do not). Further discussion of compatibility is provided below.

This positioning of the zones of the scene 70 is such that potentially incompatible instruments are within zones that are separated by significant distances. Thus, for example, the scene 70 can be configured such that a user having a virtual position within the first audio zone 72 can hear the distorted electric guitar 73a, but cannot hear the accordion 79b and a user having a virtual position within the fourth audio zone 78 can hear the accordion 79b, but cannot hear the distorted electric guitar 73a.

In some embodiments it may be possible to modify aspects of the scene 70. For example, it may be possible to change instruments within at least some of the zones (e.g. by removing one or more instruments and/or by including one or more new instruments). Whenever the audio content of a zone is changed, the nature of that zone changes. This may lead to a zone becoming incompatible in some way with one or more other zones neighbouring that zone. Alternatively, or in addition, a zone may become more compatible with one or more other zones neighbouring that zone.

Figure 8:
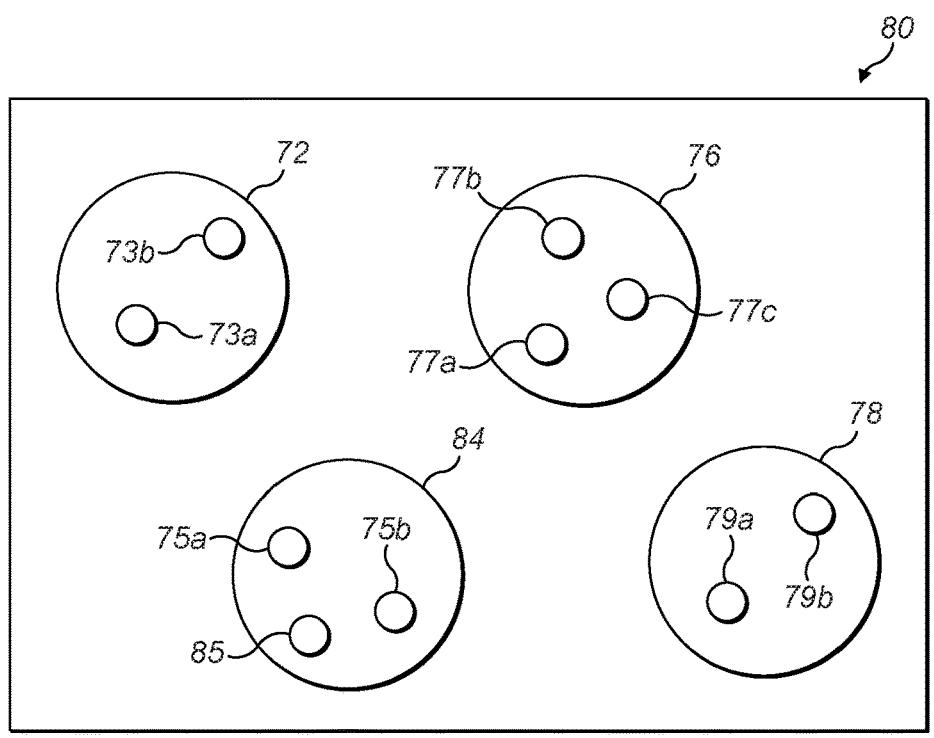

FIG. 8 is a view of a virtual scene, indicated generally by the reference numeral 80, in accordance with an example embodiment. The scene 80 includes the first audio zone 72, the third audio zone 76 and the fourth audio zone 78 described above (comprising the distorted electric guitar 73a, bass guitar 73b, shaker 77a, bongos 77b, cajon 77c, harmonica 79a and accordion 79b).

The scene 80 also includes a modified second zone 84 that includes the first and second acoustic guitars 75a and 75b of the second zone 74 described above and additionally includes an overdriven electric guitar 85.

The overdriven electric guitar 85 may, for example, have been added to the scene 80 by a user. The inclusion of one or more new instruments (such as the overdriven electric guitar 85), the removal of one or more instruments, or some other change to the audio zones may change the balance of the scene 80, such that some of the zones are no longer compatible with neighbouring zones (and/or such that some of the zones are more compatible with neighbouring zones).

Figure 9:
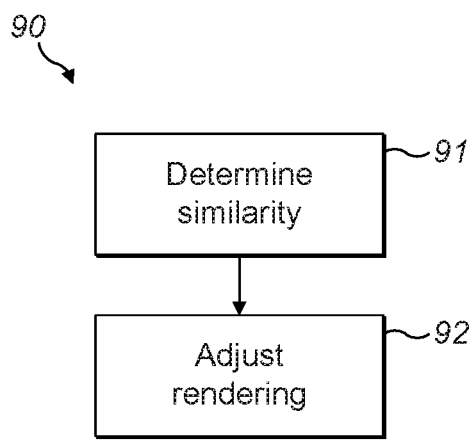
FIG. 9 is a flow chart showing an example algorithm in accordance with an example embodiment.

FIG. 9 is a flow chart showing an example algorithm, indicated generally by the reference numeral 90, in accordance with an example embodiment. The algorithm 90 provides a mechanism for adjusting audio zones in a multi-zone scene (such as a multi-zone virtual scene) following modification of an audio zone.

The algorithm 90 starts at operation 91, where a similarity between a content, such as spatial audio content, of a first audio zone and a content, such as spatial audio content, of at least one or more other audio zones of a multi-zone virtual scene is determined (for example, in response to a modification of the content of said first audio zone). As described above, the content as perceived by a user within said scene is dependent on a virtual position of the user within said scene.

The virtual scenes may be virtual scenes of a virtual reality system, as discussed above. The virtual scenes may, for example, be VR, AR, MR or XR scenes.

At operation 92, a rendering position of the first audio zone relative to said one or more other audio zones within the virtual scene is adjusted, dependent on the similarities determined in the operation 91.

Figure 10:
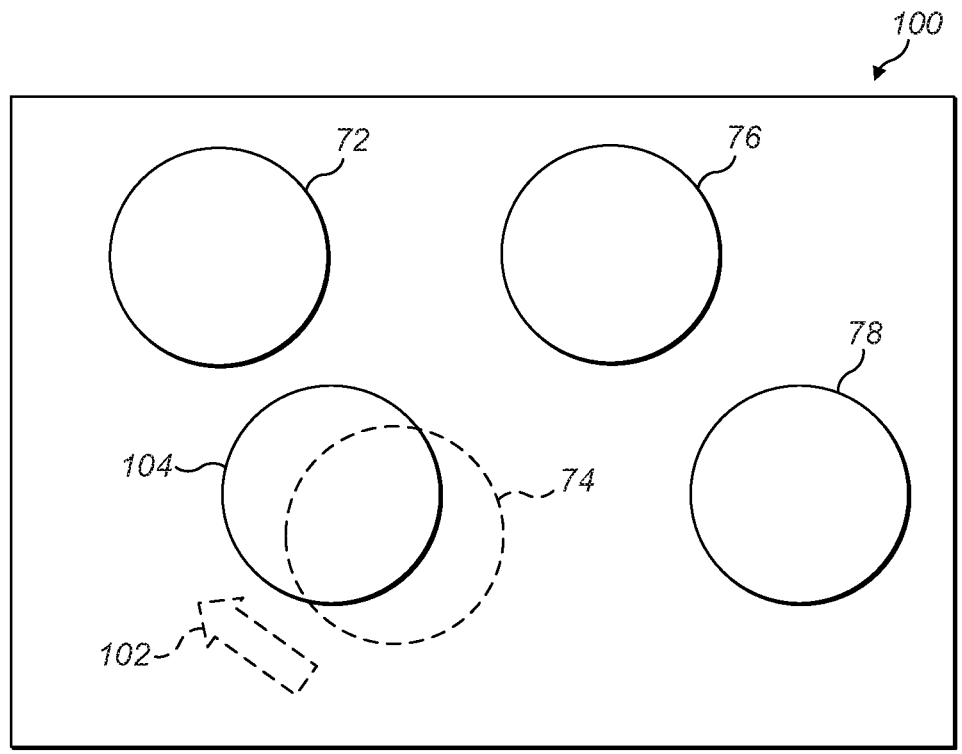
FIG. 10 is a view of a virtual scene in accordance with an example embodiment.

FIG. 10 is a view of a virtual scene, indicated generally by the reference numeral 100, in accordance with an example embodiment. The scene 100 demonstrates an example use of the algorithm 90 described above.

The scene 100 includes the first audio zone 72, the second audio zone 74, the third audio zone 76 and the fourth audio zone 78 described above (comprising the distorted electric guitar 73a, bass guitar 73b, first acoustic guitar 75a, second acoustic guitar 75b, shaker 77a, bongos 77b, cajon 77c, harmonica 79a and accordion 79b, none of which are shown in FIG. 10).

The second audio zone 74 is shown in dotted form as that zone is changed by the addition of the overdriven electric guitar 85 discussed above (also not shown in FIG. 10).

In response to the addition of the overdriven electric guitar into the scene 100, the algorithm 90 is run, such that the similarities of the zones are determined (operation 91) and the rendering of the zones adjusted accordingly (operation 92).

FIG. 10 includes a modified second zone 104 that has been moved (with respect to the second audio zone 74), as indicated by the arrow 102, as part of the operation 92 of the algorithm 90. As a result of the addition of the overdriven electric guitar 85, the modified second zone 104 of the scene 100 is determined (in operation 91) to be more similar to the first audio zone 72 and less similar to the fourth audio zone 78. As a result, the second zone is moved (as indicated by the arrow 102) to be closer to the first audio zone 72 and further away from the fourth audio zone 78.

In this way, the updated rendering position of the modified second zone 104 relative to the other zones of the scene 100 is defined such that the second audio zone is moved closer to audio zones within the scene that are more similar as a result of said modification and further away from audio zones within the scene that are less similar as a result of said modification.

The similarity between the content of the first audio zone and the content of the at least one of the one or more other audio zones in the operation 91 of the algorithm 90 may be determined, at least in part, based on similarities of attributes of said audio zones. For music, the attributes may include one or more of: pitch, timbre, spectrum, instrumentation, mood, style, harmony etc. Such attributes may comprise one or more of detected attributes and user-defined attributes. For example, such attributes may be obtained from metadata, which may, for example, be user-defined.

The skilled person will be aware of alternative means for determining similarity. For example, the similarity may be determined, at least in part, based on the similarity of content type: such as music, sports, entertainment, news, art etc., such that content items having the same type are similar and others less similar. As a further example, similarity may be determined, at least in part, based on language, or in terms of languages that are understood by a user. For example, content with the same language or languages understood by the user may be determined to be similar, and other languages less similar.

In some embodiments, the similarity of audio zones may be determined based on a number of criteria. The final similarity determination may be weighted combination of the different criteria. The weighting may be based on the relative importance of the various criteria. Thus, for example, similarity may be defined by:

$$\text{Similarity} = (w_1 * \text{timbral\_similarity}) + (w_2 * \text{stylistic\_similarity}) + (w_3 * \text{spatial\_similarity}).$$

Of course, other combinations of similarity metrics will be readily apparent to the skilled person.

In the scene 100, only the position of the modified zone is adjusted. This is not essential to all embodiments. For example, the positions of at least some (possibly all) of the other zones of the virtual scene may be adjusted.

Figure 11:
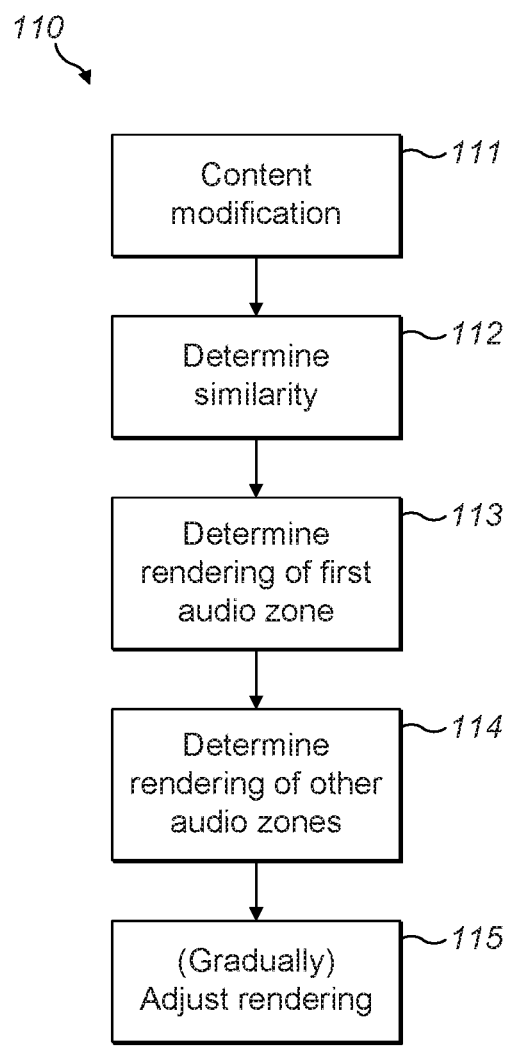
FIG. 11 is a flow chart showing an algorithm in accordance with an example embodiment.

FIG. 11 is a flow chart showing an algorithm, indicated generally by the reference numeral 110, in accordance with an example embodiment. The algorithm 110 provides a mechanism for adjusting audio zones in a multi-zone scene (such as a multi-zone virtual scene) following modification of an audio zone.

The algorithm 110 starts at operation 111, where content, such as spatial audio content, of a first audio zone of a multi-zone virtual scene (such as the scenes 70, 80 and 100 described above) is modified. A user interaction may cause said modification. The operation 111 may involve the determination of such a user interaction. Alternatively, or in addition, the operation 111 may involve initiating said user interaction.

When modification of the content of a first audio zone occurs, the algorithm 110 moves to operation 112 where a similarity between the audio zones of the multi-zone virtual scene are determined. For example, a similarity score may be determined between all of the audio zones of the scene.

At operation 113, a rendering position of the first audio zone (e.g. one or more modified audio zones) relative to said one or more other audio zones within the virtual scene is adjusted, dependent on the similarities determined in the operation 112. Similarly, at operation 114, a rendering position of one or more of the other audio zones of the virtual scene is/are adjusted. The operations 113 and 114 may be carried out separately, in any order, or may be carried out as a single operation. Thus, the rendering positions are determined in the operations 113 and 114 such that audio zones which are relatively similar are placed relatively close together and zones which are relatively dissimilar are placed relatively far apart.

At operation 115, the updated rendering positions are implemented. The operation 115 may be implemented by gradually moving audio zones into the adjusted positions, as determined in the operations 113 and 114. Moving said audio zone gradually may provide a more comfortable user experience.

In this way, a user experience can be improved since audio zones can be re-arranged so that similar audio zones (e.g. which sound good together) are arranged close together. This may provide a user with a pleasing listening experience as they traverse a scene and when moving from one audio zone to another. Moreover, a dynamically changing audio scene can be provided, since audio zones can be moved in response to audio zone changes.

It should be noted that by moving audio zones, rather than individual audio sources, a continuity of experience can be provided for a user located within a particular audio zone. This may be particular advantageous is highly dynamic systems in which many content changes are made over time.

Figure 12:
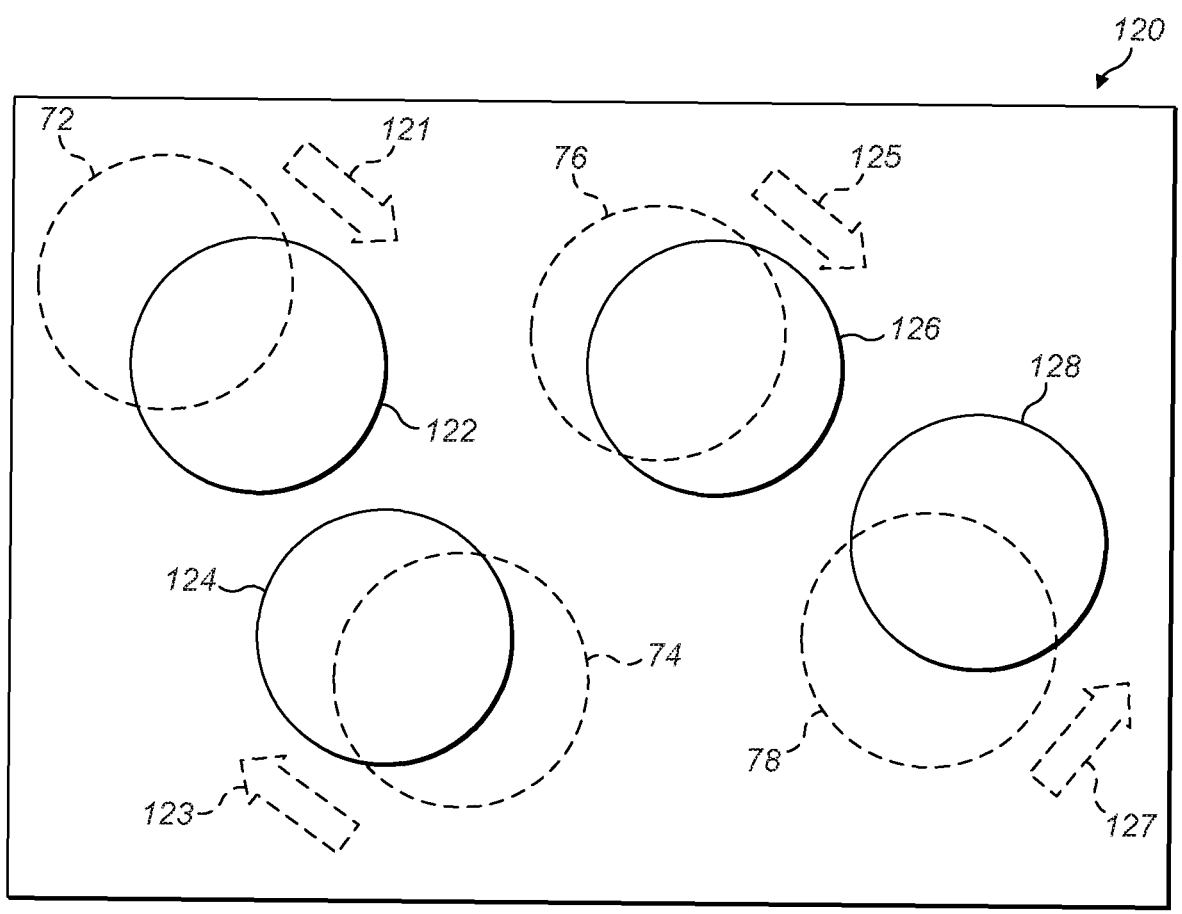
FIG. 12 is a view of a virtual scene in accordance with an example embodiment.

FIG. 12 is a view of a virtual scene, indicated generally by the reference numeral 120, in accordance with an example embodiment. The scene 120 demonstrates an example use of the algorithm 110 described above.

The scene 120 includes the first audio zone 72, the second audio zone 74, the third audio zone 76 and the fourth audio zone 78 described above (comprising the distorted electric guitar 73a, bass guitar 73b, first acoustic guitar 75a, second acoustic guitar 75b, shaker 77a, bongos 77b, cajon 77c, harmonica 79a and accordion 79b, none of which are shown in FIG. 12). The audio zones 72 to 78 are initial rendering positions and are shown in dotted form in FIG. 12.

As discussed above, assume that the second audio zone 74 is modified by the addition of the overdriven electric guitar 85 (thereby implementing operation 111 of the algorithm 110).

In response to the addition of the overdriven electric guitar into the scene 120, the similarities of the zones are determined (operation 112) and the rendering of the audio zones adjusted accordingly (operations 113 and 114). The updated rendering is the implemented, possibly gradually (operation 115)

The scene 120 includes a modified second audio zone 124 that has been moved, as indicated by the arrow 123, as part of the operation 115, to the position determined in the operation 113.

Moreover, the scene 120 includes a modified first audio zone 122, a modified third audio zone 126 and a modified fourth audio zone 128 that have been moved as indicated by the arrows 121, 125 and 127 respectively. The positions of the first, third and fourth audio zones have been modified as part of the operation 115, to the positions determined in the operation 114.

The modified first, second, third and fourth audio zones 122, 124, 126 and 128 have positions modified such that the first and second audio zones (which are determined to be more similar) are closer together and the second audio zone is further away from the third and fourth audio zones since the second audio zone is determined to be less similar to the third and fourth zones.

Thus, as discussed above with reference to FIG. 10, a modified audio zone may be moved away from audio zones that are most dissimilar and moved towards audio zones that are most similar to it such that only the audio zone that has been modified is moved. Alternatively, as discussed with reference to FIG. 12, once the similarity between a plurality of audio zones has been obtained, new positions for a plurality (e.g. all) of those audio zones may be determined.

One possible method for obtaining new positions for a plurality of audio zones includes the use of multidimensional scaling. For example, multidimensional scaling may be implemented by taking, as an input, a matrix of distances between the audio zones. The distances may be obtained by taking an inverse of the similarities between audio zones (such that the distance between audio zones may be inversely proportional to their similarity). As output, the multidimensional scaling may provide position co-ordinates for the audio zones, such that the distances between the audio zones are as close as possible to the positions defined in the distance matrix. As the input distances were based on similarities (not actual distances), the output may need to be converted into position co-ordinates (e.g. in metres). This may be achieved by scaling the output positions so that the overall size of the resulting scene does not differ to much from the original scene.

The skilled person will be aware of many alternative methods for implementing the operations 113 to 115 of the algorithm 110.

Figure 13:
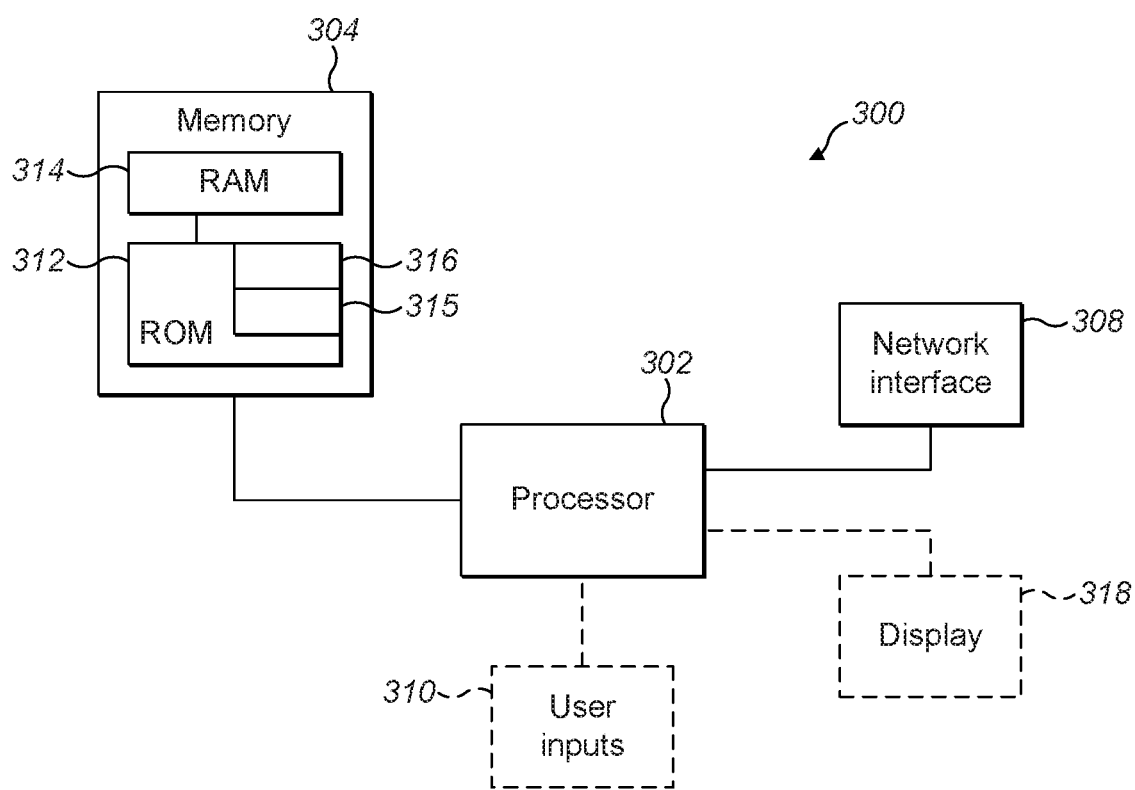
FIG. 13 is a block diagram of components of a system in accordance with an example embodiment.

For completeness, FIG. 13 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid-state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 90 and 110 described above. Note that in the case of small device/apparatus the memory can be most suitable for small size usage i.e. not always hard disk drive (HDD) or solid-state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14A:
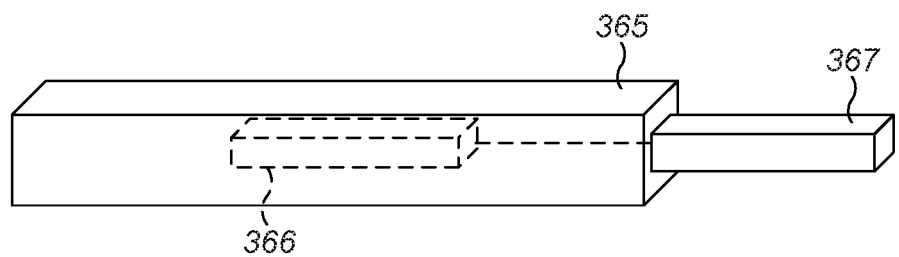
FIGS. 14A and 14B show tangible media, respectively a removable memory unit and a compact disc (CD) storing computer-readable code which when run by a computer perform operations according to example embodiments.
Figure 14B:
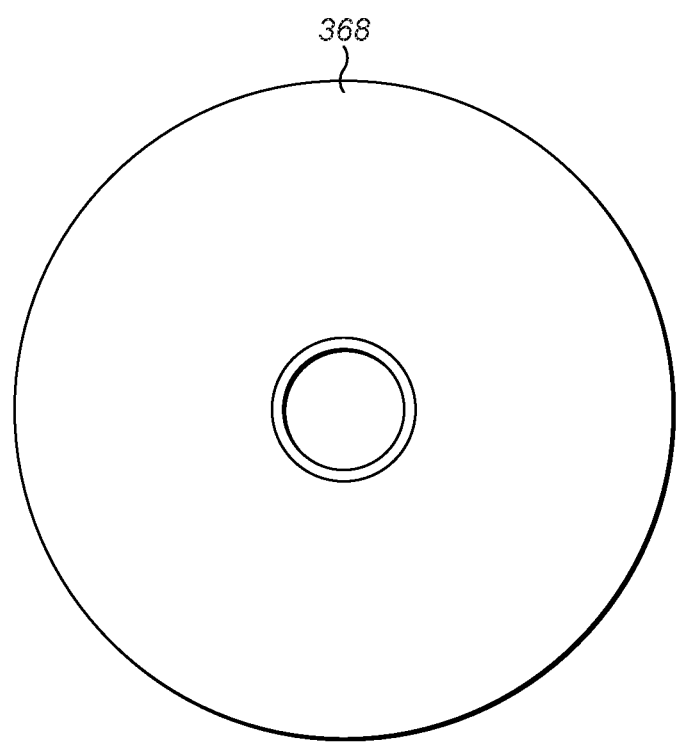

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow charts of FIGS. 9 and 11 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. The apparatus comprising
at least one processor; and
at least one memory including computer program code; the at least one memory and the computer program code configured to, with the at least one processor, cause the apparatus at least to perform:
determining a relationship between a content of a first audio zone and a content of at least one or more other audio zones of a multi-zone virtual scene, wherein the relationship is determined based on a weighted sum of similarities of a plurality of attributes of the content of the first audio zone and the content of the at least one or more other audio zones, in response to a modification of the content of the first audio zone, wherein content as perceived by a user within the scene is dependent on a virtual position of the user within the scene and wherein the audio zones have respective initial rendering positions within the scene; and
determining an updated rendering position of the first audio zone relative to the one or more other audio zones within the virtual scene, dependent on the determined relationship.

2. The apparatus as claimed in claim 1, further caused to perform, determining a first user interaction causing the modification of the content of the first audio zone.

3. The apparatus as claimed in claim 1, further caused to perform, initiating a second user interaction causing the modification of the content of the first audio zone.

4. The apparatus as claimed in claim 1, wherein the attributes comprise detected attributes or user-defined attributes.

5. The apparatus as claimed in claim 1, further caused to perform, determining an updated rendering position of one or more of the other audio zones of the multi-zone virtual scene, in response to the modification of the content of the first audio zone.

6. The apparatus as claimed in claim 5, wherein the determining the updated rendering position of the first audio zone and the determining the updated rendering positions of the one or more other audio zones of the multi-zone virtual scene are implemented using multidimensional scaling, and wherein distances between particular audio zones are inversely proportional to the weighted sum of similarities of a plurality of attributes of the content of the first audio zone and the content of the at least one or more other audio zones.

7. The apparatus as claimed in claim 6, wherein the distances of the updated rendering positions of the first audio zone and the other audio zones are determined such that the first audio zone is moved away from an audio zone with attributes that are less similar and moved towards an audio zone with attributes that are more similar.

8. The apparatus as claimed in claim 1, further caused to perform, implementing a rendering position of at least the first audio zone based on the determined updated at least one rendering position.

9. The apparatus as claimed in claim 8, wherein the implementing the rendering position of at least the first audio zone comprises adjusting the position of at least the first audio zone within the virtual scene.

10. The apparatus as claimed in claim 9, wherein the adjusting the position of at least the first audio zone adjusts the position gradually.

11. The apparatus as claimed in claim 1, wherein content of at least one of the first audio zone or at least one of the one or more other audio zones of the multi-zone virtual scene comprises spatial audio content.

12. A method comprising:
determining a relationship between a content of a first audio zone and a content of at least one or more other audio zones of a multi-zone virtual scene based on a weighted sum of similarities of a plurality of attributes of the content of the first audio zone and the content of the at least one or more other audio zones, in response to a modification of the content of the first audio zone, wherein content as perceived by a user within the scene is dependent on a virtual position of the user within the scene; and
determining an updated rendering position of the first audio zone relative to the one or more other audio zones within the virtual scene, dependent on the determined relationship.

13. The method as claimed in claim 12, further comprising determining a first user interaction causing the modification of the content of the first audio zone.

14. The method as claimed in claim 12, further comprising initiating a second user interaction causing the modification of the content of the first audio zone.

15. The method as claimed in claim 12, wherein determining the relationship between the content of the first audio zone and the content of the at least one or more other audio zones determines the relationship based on similarities of attributes of the audio zones.

16. A non-transitory computer readable medium comprising program instructions stored thereon for performing at least the following:
determining a relationship between a content of a first audio zone and a content of at least one or more other audio zones of a multi-zone virtual scene based on a weighted sum of similarities of a plurality of attributes of the content of the first audio zone and the content of the at least one or more other audio zones, in response to a modification of the content of the first audio zone, wherein content as perceived by a user within the scene is dependent on a virtual position of the user within the scene and wherein the audio zones have respective initial rendering positions within the scene; and determining an updated rendering position of the first audio zone relative to the one or more other audio zones within the virtual scene, dependent on the determined relationship.

17. The apparatus as claimed in claim 1, wherein each audio zone is associated with a plurality of sounds provided by one or more musical instruments.

* * * * *